US010449871B1

(12) United States Patent
Lyon

(10) Patent No.: US 10,449,871 B1
(45) Date of Patent: Oct. 22, 2019

(54) ELECTRICAL POWER TERMINAL FOR A CHARGING SYSTEM

(71) Applicant: TE CONNECTIVITY CORPORATION, Berwyn, PA (US)

(72) Inventor: Zachary Wood Lyon, Lewisville, NC (US)

(73) Assignee: TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 16/007,356

(22) Filed: Jun. 13, 2018

(51) Int. Cl.
*B60L 53/14* (2019.01)
*H01R 4/62* (2006.01)
*H02J 7/00* (2006.01)
*H01R 4/56* (2006.01)
*B60L 53/18* (2019.01)

(52) U.S. Cl.
CPC ............ *B60L 53/14* (2019.02); *B60L 53/18* (2019.02); *H01R 4/56* (2013.01); *H01R 4/62* (2013.01); *H02J 7/0042* (2013.01); *H02J 7/0052* (2013.01)

(58) Field of Classification Search
CPC .. B60L 11/1816; B60L 2230/12; B60L 50/64; B60L 53/14; B60L 53/16; H01R 4/56; H01R 4/62; H01R 12/515; H01R 9/24; H02J 7/0042; H02J 7/0052; H02J 7/047; G06F 1/20; H05K 1/0201; H05K 7/20; H05K 7/20154; H05K 2201/09036; H05K 2201/09981; H05K 7/20418; H05K 7/209; H05K 5/0021; H05K 7/20281; H01L 2924/0002; H01L 2924/00; H01L 23/473; H01L 2224/32245; H01L 21/67103; H01L 23/427; H02K 5/20

USPC ........ 439/487, 190, 485, 345, 709; 361/641, 361/676, 699; 310/52, 54, 64, 71; 180/65.1; 174/102 R; 165/80.4
See application file for complete search history.

(56) References Cited

U.S. PATENT DOCUMENTS

| | | | | |
|---|---|---|---|---|
| 3,980,387 A | * | 9/1976 | Neidecker | H01M 2/06 439/750 |
| 4,740,178 A | * | 4/1988 | Badenhorst | H01R 11/287 439/142 |
| 5,341,083 A | * | 8/1994 | Klontz | B60L 53/34 320/109 |
| 5,408,209 A | * | 4/1995 | Tanzer | F28D 15/0233 336/60 |
| 5,412,304 A | * | 5/1995 | Abbott | H01F 38/14 320/108 |
| 5,434,493 A | * | 7/1995 | Woody | H01F 38/14 320/108 |
| 5,594,315 A | * | 1/1997 | Ramos | H01F 38/14 320/108 |
| 5,909,099 A | * | 6/1999 | Watanabe | A61K 31/726 320/108 |

(Continued)

*Primary Examiner* — Travis S Chambers

(57) ABSTRACT

A charging system includes an electrical power terminal, a power cable, and a cooling tube. The electrical power terminal includes a pin and a block. The block has a front side and a rear side. The pin extends from the front side of the block to a distal end of the pin. The block includes a termination pad surface. The block defines a port therethrough that is spaced apart from the termination pad surface. The power cable is mechanically coupled and electrically connected to the termination pad surface of the block. The cooling tube extends into the port of the block, and is configured to absorb and dissipate heat from the block.

20 Claims, 6 Drawing Sheets

(56) References Cited

U.S. PATENT DOCUMENTS

| | | | | |
|---|---|---|---|---|
| 6,049,191 A * | 4/2000 | Terazoe | ............ | H02J 7/025 320/108 |
| 6,310,465 B2 * | 10/2001 | Najima | ............ | B60L 3/04 320/150 |
| 6,320,352 B2 * | 11/2001 | Terazoe | ............ | H02J 7/025 320/108 |
| 6,396,241 B1 * | 5/2002 | Ramos | ............ | B60L 53/34 320/108 |
| 9,321,362 B2 * | 4/2016 | Woo | ............ | B60L 11/1818 |
| 2014/0378010 A1 * | 12/2014 | Beck | ............ | H01R 4/023 439/874 |
| 2015/0217654 A1 * | 8/2015 | Woo | ............ | B60L 11/1818 320/109 |
| 2017/0338006 A1 * | 11/2017 | Gontarz | ............ | H01B 7/423 |
| 2017/0341524 A1 | 11/2017 | Heiss et al. | | |

* cited by examiner

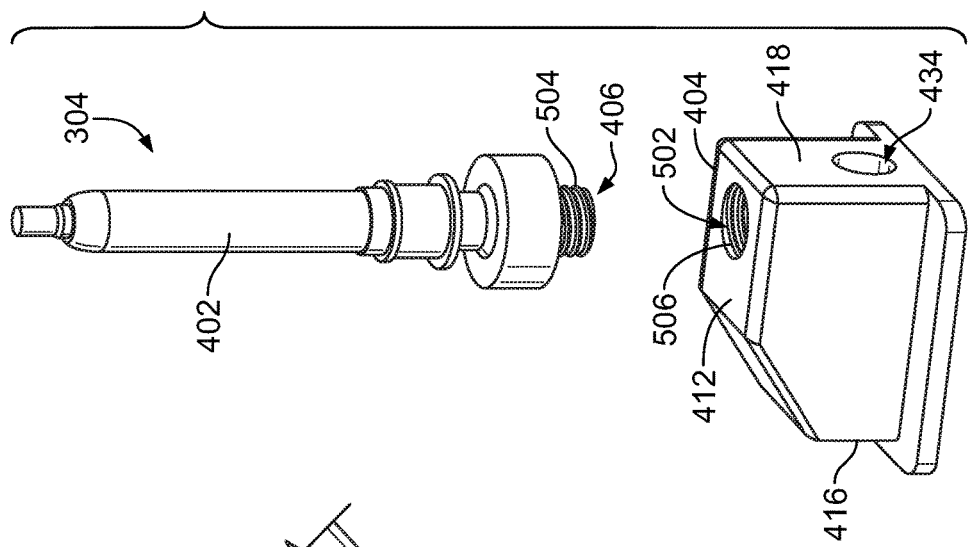
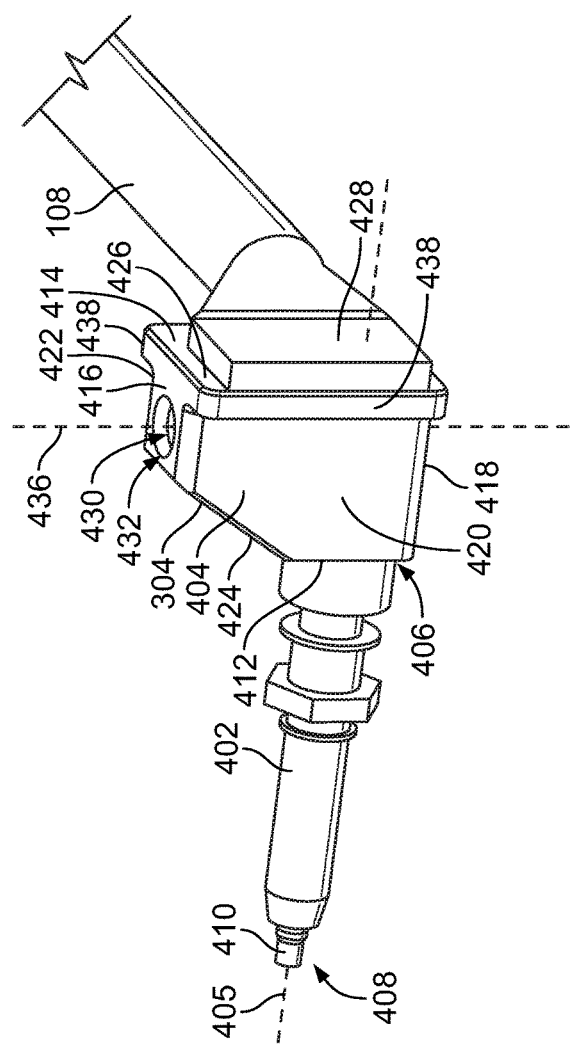
FIG. 4
FIG. 5

US 10,449,871 B1

ELECTRICAL POWER TERMINAL FOR A CHARGING SYSTEM

BACKGROUND

The subject matter herein relates to electrical charging systems that have electrical power terminals for mating to mating connectors.

Electric vehicles, including fully electric and plug-in hybrid vehicles, have charging systems for charging batteries that provide current used to propel the vehicles. The charging systems provide an electrically conductive pathway from a charging inlet on the vehicle to battery pack. The charging inlet removably couples to a mating connector of an external power source to establish an electrical connection for charging the battery pack. Because the vehicle is immobilized during charging operations, there is a desire to reduce the charging duration required to achieve a designated amount of charge in the battery pack to reduce the amount of time that the vehicle is immobile. The charging duration can be reduced by increasing the rate of power transfer. For example, some external power sources are configured to convey electrical power to a vehicle charging inlet at current levels in excess of 200 A.

At high power transfer levels, the components of the vehicle charging system may heat up due to electrical contact resistances. Increased temperatures of the charging system may have several unfavorable effects. For example, some of the components may become deformed and damaged due to high temperatures. The vehicle also may have a controller that monitors the temperature of the charging system. During a charging operation, if the controller detects that a temperature exceeds a threshold, the controller may be programmed to decrease the power transfer level, which unfavorably increases charging duration.

A need remains for a charging system that is able to dissipate heat to provide high power transfer levels over sustained periods of time for reducing charging durations.

SUMMARY

In one or more embodiments of the present disclosure, a charging system is provided that includes an electrical power terminal, a power cable, and a cooling tube. The electrical power terminal includes a pin and a block. The block has a front side and a rear side. The pin extends from the front side of the block to a distal end of the pin. The block includes a termination pad surface. The block defines a port therethrough that is spaced apart from the termination pad surface. The power cable is mechanically coupled and electrically connected to the termination pad surface of the block. The cooling tube extends into the port of the block, and is configured to absorb and dissipate heat from the block.

In one or more embodiments, an electrical power terminal is provided that includes a pin and a block. The pin has a distal end and a proximal end opposite the distal end. The block has a front side and a rear side opposite the front side. The front side of the block is attached to the proximal end of the pin. The block defines a port therethrough that is configured to receive a cooling tube. The block includes a termination pad surface that is planar and is configured to mechanically couple and electrically connect to a power cable.

In one or more embodiments, a charging system is provided that includes a charging inlet, multiple power cables, and multiple cooling tubes. The charging inlet includes a housing and multiple electrical power terminals held by the housing. The charging inlet is configured to releasably couple to a mating connector of an external power source. Each of the power terminals includes a pin and a block. The block has a front side and a rear side. The pin extends from a front side of the block to a distal end of the pin. The block includes a termination pad surface. The block defines a port therethrough that is spaced apart from the termination pad surface. The power cables extend from the charging inlet to a battery pack. Each of the power cables is mechanically coupled to and electrically connected to the termination pad surface of a different one of the power terminals. The cooling tubes extend from the charging inlet to a heat sink for dissipating heat from the charging inlet. Each of the cooling tubes extends into the port of the block of a different one of the power terminals.

BRIEF DESCRIPTION OF THE DRAWINGS

FIG. 4 is a perspective view of an electrical power terminal of the charging inlet and one of the power cables of the charging system according to an embodiment.

FIG. 5 is an exploded perspective view of one of the electrical power terminals of the charging inlet according to an embodiment.

DETAILED DESCRIPTION

Figure 1:
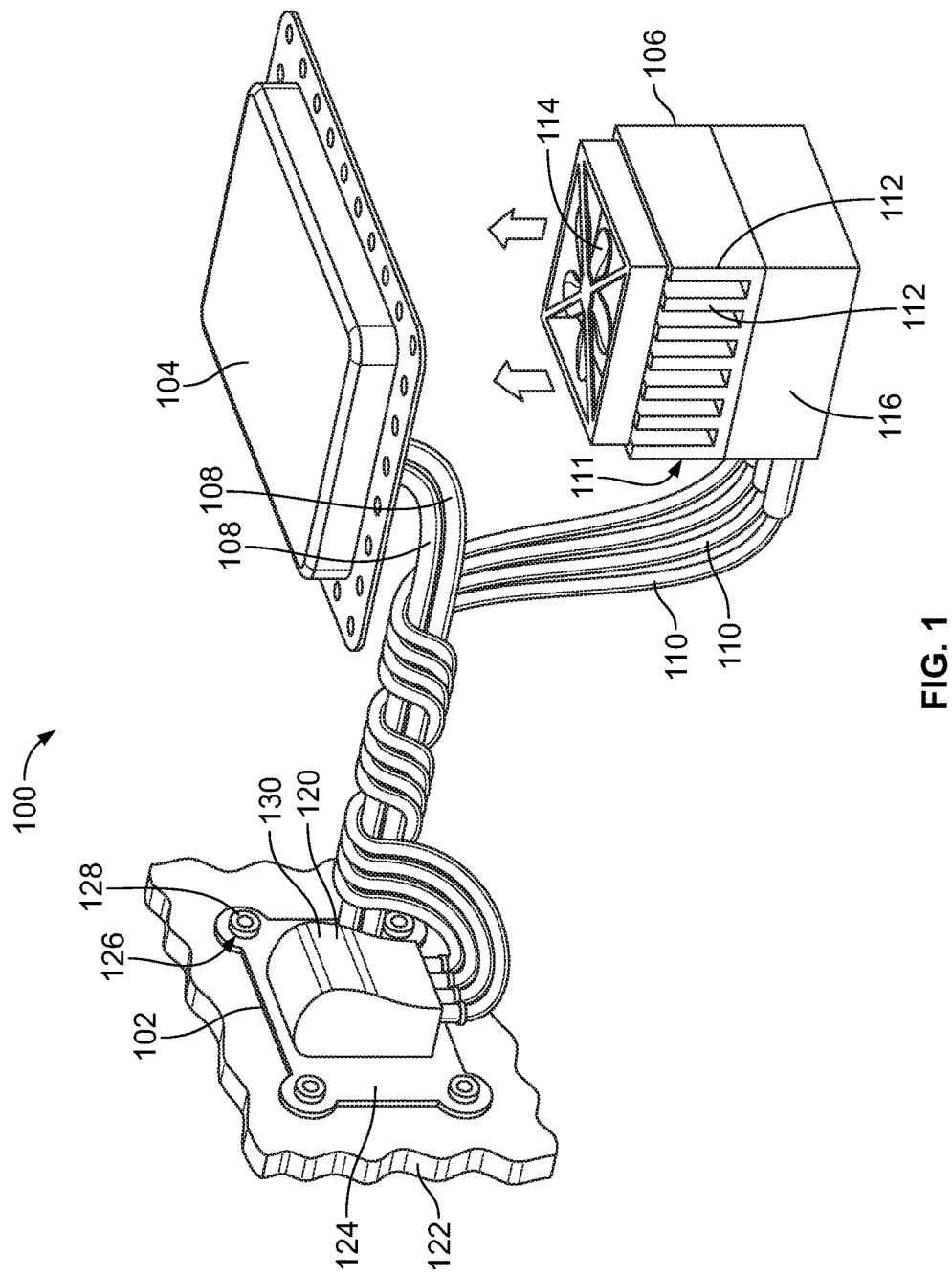
FIG. 1 illustrates a charging system according to an embodiment.

FIG. 1 illustrates a charging system 100 according to an embodiment. The charging system 100 includes a charging inlet 102, a battery pack 104, a heat sink 106, power cables 108 extending from the charging inlet 102 to the battery pack 104, and cooling tubes 110 extending from the charging inlet 102 to the heat sink 106. The charging system 100 may be mounted onboard a vehicle, a vessel, or another type of mobile electric machine. For example, the charging system 100 may be mounted onboard an electric vehicle, such as the vehicle 202 shown in FIG. 2. Alternatively, the charging system 100 may be disposed within a building, such as a manufacturing facility.

The charging system 100 is designed to convey high power electrical energy (e.g., current) from the charging inlet 102 to the battery pack 104 through the power cables 108 to charge the battery pack 104. The battery pack 104 includes one or more battery cells. The cooling tubes 110 and heat sink 106 provide cooling circuits for dissipating heat from the charging inlet 102 and/or the power cables 108 to thermally control and manage the charging operation. For example, the charging system 100 may be able to convey electric current up to or exceeding 400 A. The high current power transfer generates heat within the charging inlet 102 and along the power cables 108 due to electrical resistances of the current-carrying conductors. The amount of heat that is generated increases with increasing power transfer rates. The cooling tubes 110 are connected to the charging inlet 102 and/or the power cables 108 and absorb heat to cool the charging inlet 102 and/or the power cables 108. The cooling tubes 110 transfer the heat via conduction and/or convection to the heat sink 106. The heat sink 106 is configured to dissipate and exhaust the heat from the cooling tubes 110.

The heat sink 106 may be a passive or active device. In the illustrated embodiment, the heat sink 106 includes an array 111 of heat exchanger fins 112 and a fan 114 mounted on the array 111. The fan 114 is actively powered to move air through the heat exchanger fins 112. Optionally, the heat sink 106 may be operably connected to the battery pack 104 to support thermal management of the battery pack 104. For example, the heat sink 106 may be positioned proximate to the battery pack 104, and the fan 114 may force air towards the battery pack 104 to support cooling of the battery pack 104. In the illustrated embodiment, the heat sink 106 is disposed underneath the battery pack 104 and blows air upward towards the battery pack 104. The heat sink 106 optionally includes a fluid pump 116 that is actively controlled to pump a working fluid, such as water or a refrigerant, through the cooling tubes 110. For example, heat absorbed by the working fluid at the charging inlet 102 and/or the power cables 108 may be transferred to air and/or the structure of the heat sink 106 at the heat sink 106, and the fan 114 encourages the dissipation of the heat from the heat sink 106. The array 111 of fins 112 is stacked between the fan 114 and the fluid pump 116 in the illustrated embodiment.

The heat sink 106 may have different components and/or configurations in other embodiments. For example, in one alternative embodiment, the heat sink 106 may be entirely passive, such as including only the array 111 of fins 112 operably coupled to the cooling tubes 110. The heat sink 106 could potentially be any structure or device, such as a vehicle chassis, that is at a lower temperature than the charging inlet 102 and the power cables 108, such that a temperature gradient exists that allows for heat transfer towards the heat sink 106.

The charging inlet 102 is designed to releasably couple directly to a mating connector of an external power source to establish an electrical connection for conducting current from the external power source to the battery pack 104. FIG. 1 shows a back side 120 of the charging inlet 102. The charging inlet 102 has a mating interface along a front side 302 (shown in FIG. 3) that is opposite the back side 120. The mating interface engages and couples to the mating connector. The charging inlet 102 is mounted to a panel 122 in the illustrated embodiment. The panel 122 may be a body panel of a vehicle or the like. The charging inlet 102 includes a mounting flange 124 with defined apertures 126. The apertures 126 receive fasteners 128 therethrough to mount the charging inlet 102 to the panel 122. The fasteners 128 may be screws, bolts, rivets, or the like. The charging inlet 102 includes a cover 130 along the back side 120 which encases various electrical components of the charging inlet 102. In one or more embodiments, both the power cables 108 and the cooling tubes 110 extend into the cover 130. For example, as described in more detail herein, the power cables 108 and the cooling tubes 110 mechanically engage electrical power terminals 304 (shown in FIG. 3) of the charging inlet 102 within the cover 130.

Figure 2:
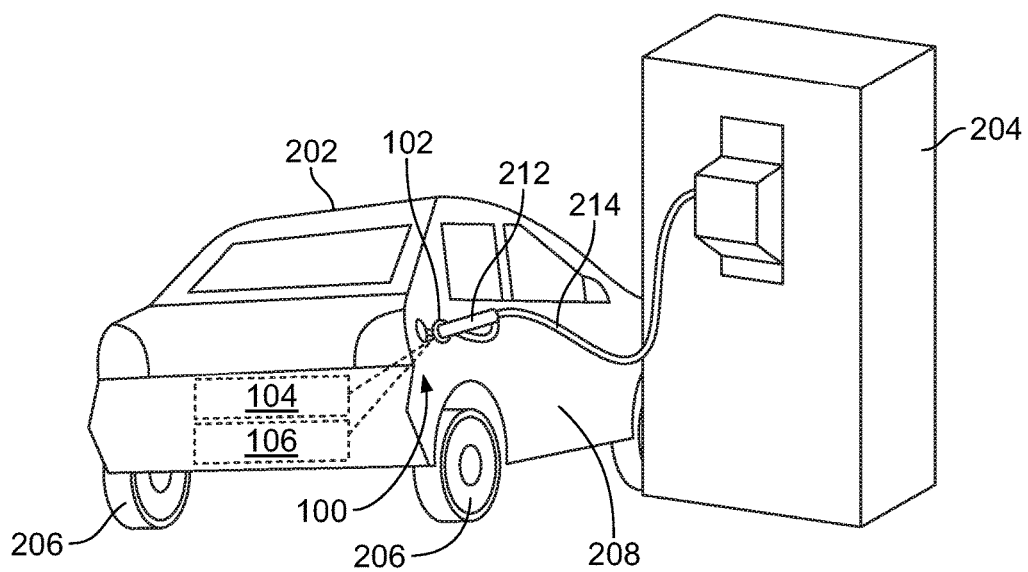
FIG. 2 illustrates an example application of the charging system installed on an electric vehicle according to an embodiment.

FIG. 2 illustrates an example application of the charging system 100 installed on an electric vehicle 202 according to an embodiment. FIG. 2 shows the electric vehicle 202 parked next to a charging station 204. The battery pack 104 and the heat sink 106 are mounted onboard the electric vehicle 202, and are schematically illustrated as boxes in FIG. 2. The battery pack 104 provides electrical power to a traction motor (not shown) that generates tractive effort to the drivetrain and wheels 206 for propelling the vehicle 202. Optionally, the traction motor may be selectively functional as a generator when tractive effort is not desired, such as when driving downhill, to generate electrical energy for charging the battery pack 104 using regenerative braking. The electric vehicle 202 may be a fully electric vehicle that lacks a combustion engine, a plug-in hybrid that includes both a combustion engine and the battery pack 104, or the like.

The charging inlet 102 of the charging system 100 is mounted to a side 208 of the vehicle 202. In the illustrated embodiment, the charging inlet 102 is coupled to a mating connector 212 of the charging station 204. The charging station 204 represents an external power source that is used to charge the battery pack 104. The mating connector 212 is a plug connector that is coupled to the charging station 204 via an electrical power cable 214. The coupling of mating connector 212 to the charging inlet 102 establishes a conductive pathway to conduct current from the charging station 204 to the battery pack 104. When the vehicle 202 is not proximate to a charging station 204, the charging inlet 102 may connect to other external power sources to charge the battery pack 104, such as home electrical outlets, external generators, and the like. Although FIG. 2 shows the charging system 100 installed on an electric passenger automobile 202, the charging system 100 may be installed on other types of transportation vehicles, such as buses, semi-trucks, marine vessels, or the like.

Figure 3:
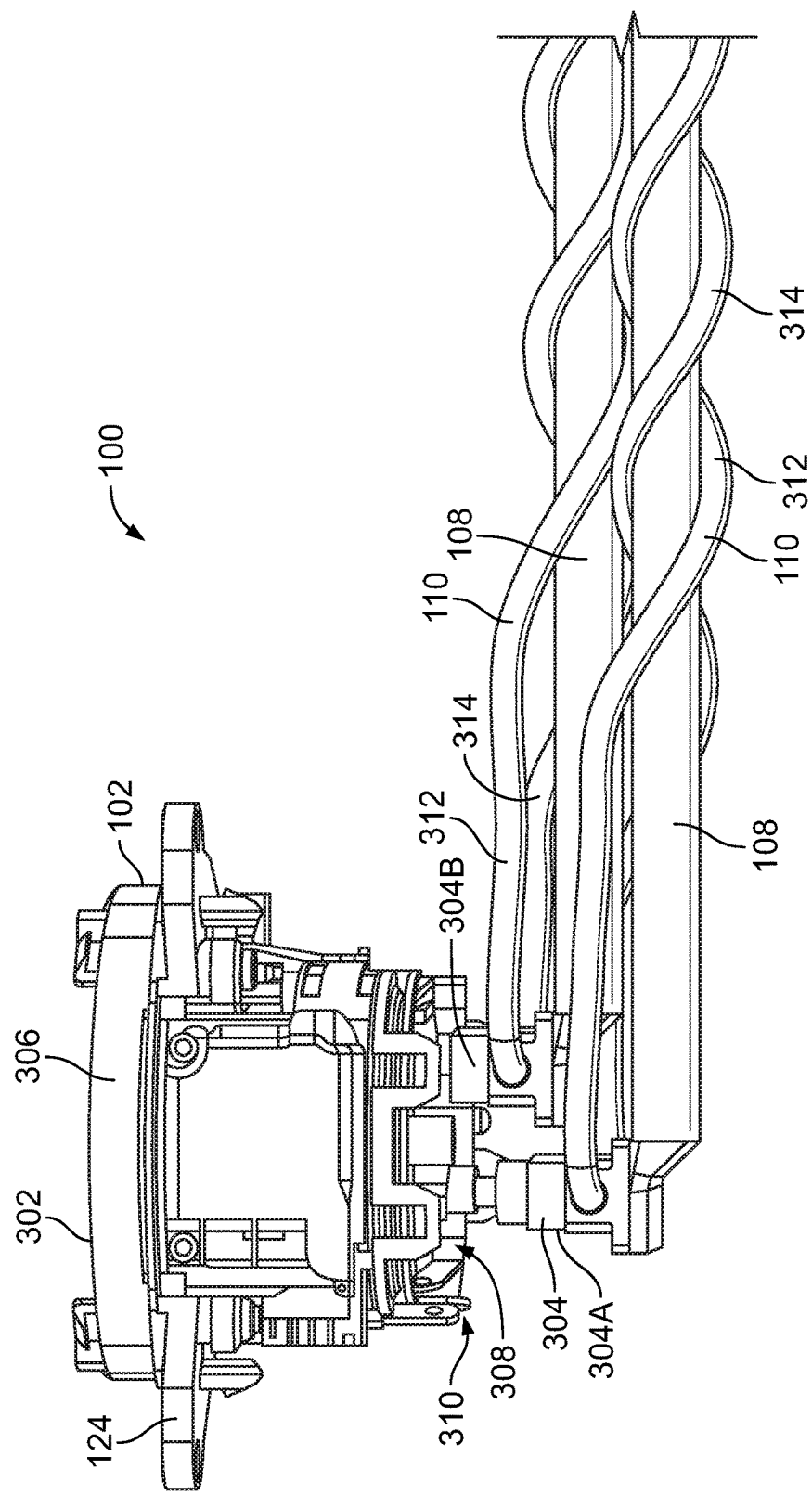
FIG. 3 is a top down view of a charging inlet and lengths of power cables and cooling tubes of the charging system according to an embodiment.

FIG. 3 is a top down view of the charging inlet 102 and lengths of the power cables 108 and the cooling tubes 110 of the charging system 100 according to an embodiment. The charging inlet 102 is shown with the cover 130 (shown in FIG. 1) removed to show some of the internal components of the charging inlet 102. The charging inlet 102 includes a housing 306 and electrical power terminals 304. The mounting flange 124 may be a portion of the housing 306, or may be coupled to the housing 306. The housing 306 defines the front side 302 of the charging inlet 102 that couples to the mating connector 212 (shown in FIG. 2).

Two electrical power terminals 304 are shown in FIG. 3. The electrical power terminals 304 extend into cavities 308 of the housing 306 from a rear end 310 of the housing 306. Portions of the power terminals 304 project beyond the rear end 310 of the housing 306 and engage the cooling tubes 110 and the power cables 108 outside of the housing 306. Optionally, the power terminals 304 may protrude different lengths beyond the rear end 310 of the housing 306. For example, a first power terminal 304A may project farther from the housing 306 than a second power terminal 304B, which may allow for offsetting the power cables 108 and the cooling tubes 110. The portions of the power terminals 304 that are visible in FIG. 3 may be encased within the cover 130 when the cover 130 is attached to the charging inlet 102.

Each of the power terminals 304 is mechanically secured to, and electrically connected to, a different one of the power cables 108. Each of the power terminals 304 is mechanically secured to a different one of the cooling tubes 110. As such, FIG. 3 shows two power cables 108A, 108B and two cooling tubes 110A, 110B. Each of the cooling tubes 110 loops around at the power terminals 304. For a given working fluid flow direction, each of the cooling tubes 110 includes a first segment or length 312 upstream of the corresponding power terminal 304 and a second segment or length 314 downstream of the corresponding power terminal 304. The power cables 108 end at the power terminals 304, so only a single segment of each power cable 108 extends from the corresponding power terminal 304.

The power terminals 304 may be configured to convey high power electrical energy (e.g., high voltage, high current, etc.). In an embodiment, the power terminals 304 are direct current (DC) fast charge pins for conveying direct current at high power levels. The charging inlet 102 may include other power terminals held within the housing 306 in addition to the power terminals 304. For example, the charging inlet 102 may include power terminals for conveying alternating current (AC) at reduced power levels relative to the power levels conveyed along the power terminals 304. The other power terminals may be connected to power cables that are not shown in FIG. 3. Unlike the power terminals 304 shown in FIG. 3, the other power terminals may not engage the cooling tubes 110.

FIG. 4 is a perspective view of one of the electrical power terminals 304 and one of the power cables 108 of the charging system 100 (shown in FIG. 1) according to an embodiment. The electrical power terminal 304 shown in FIG. 4 may represent either of the terminals 304 shown in FIG. 3. The power terminal 304 includes a pin 402 and a block 404. The pin 402 is an elongated shaft that has a proximal end 406 and a distal end 408 opposite the proximal end 406. The proximal end 406 is attached to the block 404, and the distal end 408 is spaced apart from the block 404. The pin 402 linearly extends along a pin axis 405 from the proximal end 406 to the distal end 408. The pin 402 may be generally cylindrical, and optionally has a varying diameter along the length of the pin 402 due to various features such as shoulders, collars, and the like. The pin 402 represents a contact of the charging inlet 102 for mechanically and electrically connecting to a complementary mating contact of a mating connector (e.g., the mating connector 212 shown in FIG. 2). The distal end 408 of the pin 402 may have any shape and size for securing to the complementary mating contact, such as a post 410 (as shown), a receptacle or socket, a planar blade, or the like.

The block 404 has a front side 412 and a rear side 414 opposite the front side 412. The pin 402 extends from the front side 412 of the block 404. For example, the proximal end 406 of the pin 402 is connected to the front side 412 of the block 404. The pin 402 may be removably or irremovably connected to the block 404. The block 404 has several outer sides that extend from the front side 412 to the rear side 414. For example, the block 404 has a first outer side 416 and a second outer side 418 opposite the first outer side 416. The block 404 also has a third outer side 420 and a fourth outer side 422 that is opposite the third outer side 420. In the illustrated orientation of the power terminal 304 shown in FIG. 4, the first outer side 416 is a top side and the second outer side 418 is a bottom side. As used herein, relative or spatial terms such as "front," "rear," "top," "bottom," "inner," and "outer" are only used to identify and distinguish the referenced elements in the illustrated figures and do not necessarily require particular positions or orientations relative to gravity and/or the surrounding environment of the charging system 100. The block 404 is optionally chamfered to include a slope surface 424 that extends from the front side 412 to the top side 416. The block 404 may have multiple slope surfaces or no slope surfaces in alternative embodiments. The block 404 optionally includes a flange or lip 438 at the rear side 414 that projects outward beyond the third outer side 420 and the fourth outer side 422. A portion of the rear side 414 is defined by the flange 438.

The block 404 includes a termination pad surface 426 that engages one or more electrical conductors 428 of the power cable 108 to electrically connect the power terminal 304 to the power cable 108. In an embodiment, the termination pad surface 426 is planar (e.g., flat) and is designed to enable mechanical coupling of the conductor(s) 428 to the block 404 via a chemical bonding process, such as welding, soldering, or the like. In a non-limiting example, the conductor(s) 428 of the power cable 108 are ultrasonically welded to the termination pad surface 426 to irremovably mechanically couple and electrically connect the power cable 108 to the power terminal 304. In the illustrated embodiment, the termination pad surface 426 is located on the rear side 414 of the block 404. The termination pad surface 426 is located opposite the front side 412, from which the pin 402 projects. Although the termination pad surface 426 is located on the rear side 414 in the illustrated embodiment, in an alternative embodiment the termination pad surface 426 may be on one of the outer sides, such as the third outer side 420 or the fourth outer side 422.

The block 404 defines a port 430 through the block 404 that is spaced apart from the termination pad surface 426. The port 430 is a cooling channel that is configured to receive one of the cooling tubes 110 (FIG. 3) therein to absorb and dissipate heat from the power terminal 304.

In the illustrated embodiment, the port 430 extends into the block 404 from a first opening 432 along the first outer side 416 (e.g., the top side). The port 430 linearly extends through the block 404 to a second opening 434 along the second outer side 418, which is shown in FIG. 5. The port 430 is elongated along a port axis 436. The port axis 436 may be parallel to a plane of the termination pad surface 426. Thus, as shown in FIG. 4, the port 430 does not interfere with the engagement between the conductor(s) 428 of the power cable 108 and the termination pad surface 426. The port axis 436 may be transverse, such as perpendicular, to the pin axis 405 defined by the pin 402. The port 430 may be spaced apart from the pin 402 and from the front side 412 of the block 404. In the illustrated embodiment, the port 430 is axially disposed between the pin 402 and the termination pad surface 426 along the pin axis 405, but does not intersect the pin 402 or the termination pad surface 426. For example, the port 430 is located between and spaced apart from each of the front side 412 and the rear side 414 of the block 404. Although the port 430 extends from the first outer side 416 (e.g., the top side) to the second outer side 418 (e.g., the bottom side) in FIG. 4, the port 430 in an alternative embodiment may extend from the third outer side 420 to the fourth outer side 422, or the like.

The power terminal 304 is composed of one or more metals. For example, the block 404, or at least the termination pad surface 426 thereof, may be composed of copper. The copper of the termination pad surface 426 may enable a strong welded connection to the conductor(s) 428 of the power cable 108 which may also be copper. For example, the similar compositions of the termination pad surface 426 and the conductor(s) 428 may enable a mechanically strong and electrically efficient welded connection with a low resistance at the interface. The termination pad surface 426 may be ultrasonically welded to the conductor(s) 428 of the power cable 108.

The power terminal 304 may be a unitary, monolithic component such that the pin 402 is integral to the block 404 without any seams or joints between the pin 402 and the block 404. Alternatively, the pin 402 and the block 404 may be discrete components that are coupled together to define the power terminal 304.

FIG. 5 is an exploded perspective view of one of the electrical power terminals 304 of the charging inlet 102 (shown in FIG. 3) according to an embodiment. The power terminal 304 in the illustrated embodiment has a two-piece design such that the pin 402 is discrete from the block 404. The block 404 defines an aperture 502 along the front side 412. The proximal end 406 of the pin 402 is received into the aperture 502 to couple the pin 402 to the block 404, forming the power terminal 304. In the illustrated embodiment, the proximal end 406 of the pin 402 has a threaded shaft 504, and the aperture 502 includes complementary helical threads 506 to enable the pin 402 to be screwed into the aperture 502. In an alternative embodiment, the proximal end 406 of the pin 402 may be press-fit into the aperture 502 (instead of screwed) and secured within the aperture 502 via an interference fit. For example, the block 404 may be heated prior to joining the pin 402 to enable the aperture 502 to slightly expand. The pin 402 may be joined to the block 404 via other processes in other embodiments, such as welding, soldering, adhesives, or the like.

One potential benefit of the two-piece power terminal 304 is that the metallic composition of the pin 402 may be varied from the metallic composition of the block 404 according to the specific functions of the pin 402 and the block 404. For example, the block 404 may have a composition that is tailored for heat conduction, electrical conduction, and for welding to the conductor(s) 428 (shown in FIG. 4) of the power cable 108. For these purposes, the block 404 may have a relatively high copper content. The pin 402, on the other hand, may have a different composition that is tailored for the ability to shape (e.g., lathe, mill, turn, bore, etc.) the metal into a specific shape to interface with a mating connector. For these purposes, the pin 402 may have a lower copper content than the block 404, and may include other metals and/or alloys, such as stainless steel, aluminum, or the like.

Figure 6:
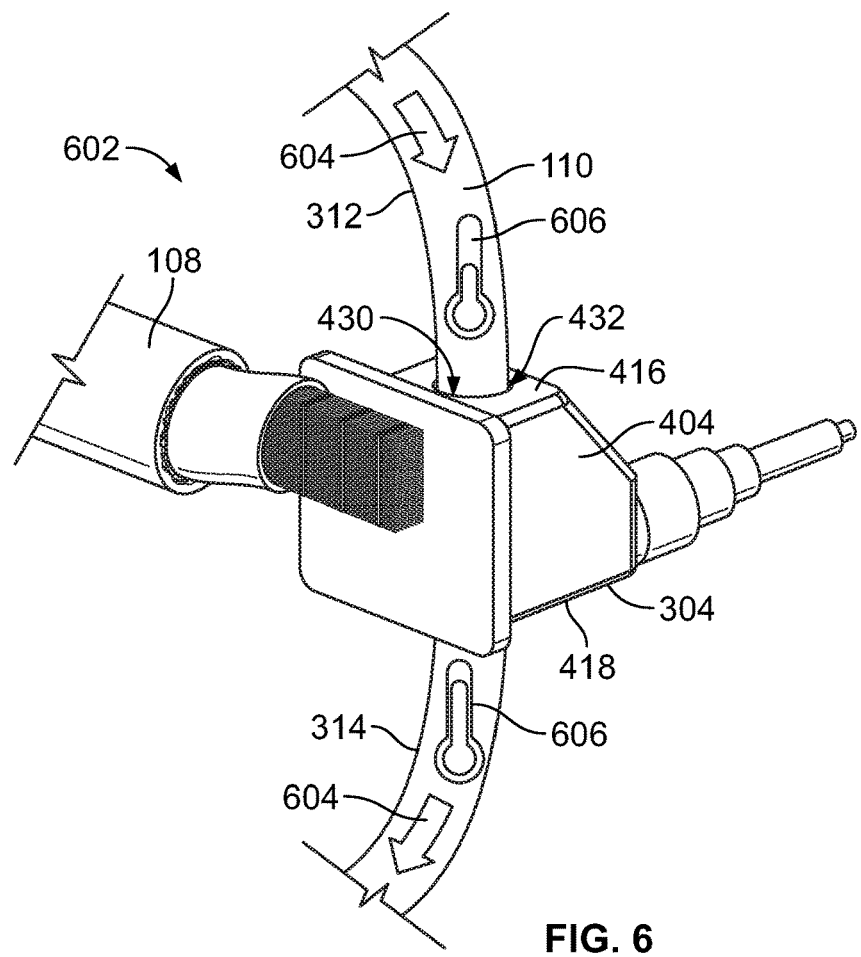
FIG. 6 is a rear perspective view of a terminal sub-assembly of the charging system according to an embodiment.

FIG. 6 is a rear perspective view of a terminal sub-assembly 602 of the charging system 100 (shown in FIG. 1) according to an embodiment. The terminal sub-assembly 602 includes one of the electrical power terminals 304 of the charging inlet 102 (shown in FIG. 3), one cooling tube 110, and one power cable 108. The power terminal 304 in FIG. 6 is the assembled power terminal 304 from FIG. 5. The cooling tube 110 extends continuously through the port 430 and protrudes from both the first opening 432 along the first outer side 416 (e.g., the top side) and the second opening 434 (shown in FIG. 5) along the second outer side 418 (e.g., the bottom side). For example, the first segment 312 of the cooling tube 110 projects from the first opening 432, and the second segment 314 of the cooling tube 110 projects from the second opening 434. A segment of the cooling tube 110 between the first segment 312 and the second segment 314 is disposed within the port 430 and not visible in FIG. 6.

The cooling tube 110 is configured to absorb heat from the block 404 of the power terminal 304 to manage the temperature of the power terminal 304 during charging operations. For example, the cooling tube 110 may contain a working fluid that flows through the cooling tube 110 in a first direction of flow 604 from the first segment 312 through the port 430 into the second segment 314 (and to the heat sink 106 shown in FIG. 1). The working fluid may be water, a refrigerant, air, or the like. The cooling tube 110 absorbs heat from the block 404, such that the second segment 314 of the cooling tube 110 (and the working fluid therein) has a greater temperature than the first segment 312 of the cooling tube 110 (and the working fluid therein), as indicated by the illustrated thermometers 606 in FIG. 6. Alternatively, the cooling tube 110 may not contain a working fluid. For example, the cooling tube 110 may be solid and may transfer heat via conduction only (e.g., without convection).

In another alternative embodiment, the cooling tube 110 may be a sealed heat pipe that includes a working fluid that undergoes phase transitions within the heat pipe to transfer heat away from the block 404. The heat pipe cooling tube 110 may have a sealed end that is located within the port 430 or projects slightly beyond the port 430. Instead of forming a loop through the port 430 to define the first segment 312 and the second segment 314, the heat pipe cooling tube 110 only has a single segment extending between the power terminal 304 and the heat sink 106. In the embodiment in which the cooling tube 110 is a heat pipe, the port 430 optionally may not extend fully through the block 404. For example, the block 404 may define only the first opening 432 for the port 430, and the port 430 may end within the block 404.

Figure 7:
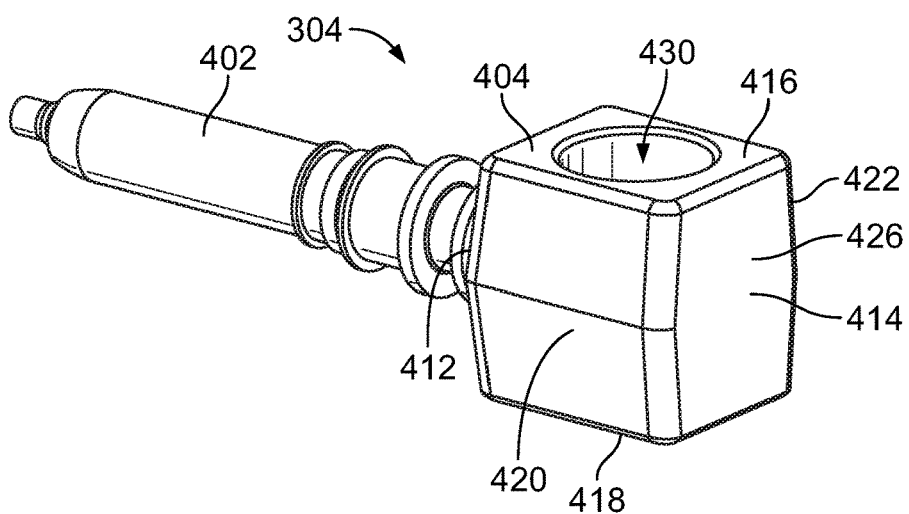
FIG. 7 is a perspective view of one of the electrical power terminals of the charging inlet according to another embodiment.

FIG. 7 is a perspective view of one of the electrical power terminals 304 of the charging inlet 102 (shown in FIG. 3) according to another embodiment. The shape of the block 404 of the electrical power terminal 304 in FIG. 7 is slightly different than the block 404 in FIGS. 3 through 6. For example, the block 404 in FIG. 7 is not chamfered and so does not include the sloped surface 424 shown in FIGS. 3 through 6. The block 404 in the illustrated embodiment also lacks the flange 438 shown in FIGS. 3 through 6. Similar to the block 404 shown in FIGS. 3 through 6, the block 404 in the illustrated embodiment includes a termination pad surface 426 along the rear side 414 that is opposite the front side 412 attached to the pin 402, and the port 430 is defined through the block 404 from the first outer side 416 (e.g., top side) to the second outer side 418 (e.g., bottom side). The termination pad surface 426 may be located along the third outer side 420 or the fourth outer side 422 in another embodiment.

The electrical power terminal 304 shown in FIG. 7 also differs from the power terminal 304 shown in FIGS. 3 through 6 because the electrical power terminal 304 has a unitary, one-piece, monolithic structure. The pin 402 and the block 404 are integral to one another such that the power terminal 304 lacks an interface joint or seam between the pin 402 and the block 404. The monolithic structure may be achieved by forming the pin 402 and the block 404 together as one piece during a common operation, such as a molding process. The monolithic structure may also be achieved by welding the pin 402 and the block 404 together such that the material of the pin 402 melds and fuses with the material of the block 404 to form a unitary, one-piece construction. The pin 402 may have the same metallic composition as the block 404 in the illustrated embodiment.

Figure 8:
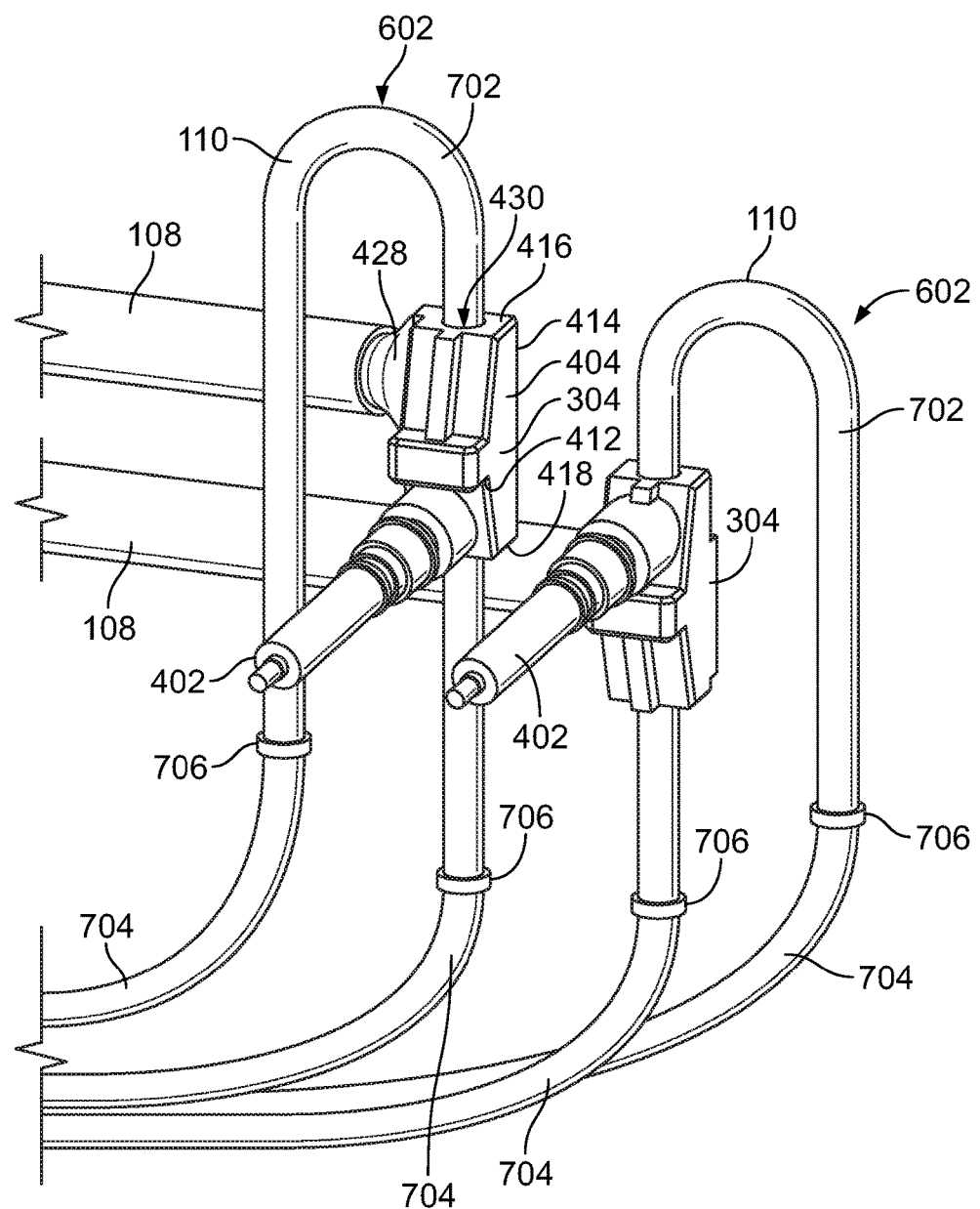
FIG. 8 is a front perspective view of two terminal sub-assemblies of the charging system according to an embodiment.

FIG. 8 is a front perspective view of two terminal sub-assemblies 602 of the charging system 100 (shown in FIG. 1) according to an embodiment. The blocks 404 of the electrical power terminals 304 have slightly different shapes than the blocks 404 of the embodiments shown in FIGS. 3-7. But, similar to other embodiments described herein, the pins 402 extend from the front sides 412 of the blocks 404, the conductors 428 of the power cables 108 are mechanically and electrically connected to the rear sides 414 of the blocks 404, and the ports 430 linearly extend from the first outer sides 416 to the second outer sides 418 of the blocks 404.

In an embodiment, the cooling tubes 110 have terminal coupling regions 702 in and around the blocks 404. The terminal coupling regions 702 are composed of a metal material, which enables the cooling tubes 110 to absorb and conduct significant amounts of heat without melting or deforming due to the high temperature of the blocks 404. The terminal coupling regions 702 of the cooling tubes 110 are connected to insulative regions 704 of the cooling tubes 110 at locations spaced apart from the power terminals 304. The insulative regions 704 are composed of electrically insulative polymeric material, such as one or more plastics. The insulative regions 704 break the conductive pathways that extend from the blocks 404 through the metallic terminal coupling regions 702 of the cooling tubes 110 to prevent electrical current flow through the cooling tubes 110. The insulative regions 704 may be coupled to the ends of the terminal coupling regions 702 via mechanical joining members 706, such a crimped O-ring joints, heat shrink sheaths, or the like. In an alternative embodiment, the entire lengths of the cooling tubes 110 may be composed of a polymeric material that is configured to withstand the high temperatures within the ports 430 without melting or deforming.

At least one technical effect of the charging system 100 described herein is ability thermally manage the electrical power terminals 304 of the charging inlet 102 during high power charging operations. For example, as the temperature of the power terminals 304 rises, the active cooling circuit (e.g., the fluid pump 116) may increase the flow rate of the working fluid through the cooling tubes 110 to dissipate more heat from the terminals 304. By controlling the temperature of the power terminals 304 utilizing the cooling tubes 110 that extend into the blocks 404 of the terminals 304, the charging system 100 may be able to transfer electrical energy at greater rates (e.g., greater voltages and/or currents) than known charging systems without damaging components or reaching designated upper temperature limits that automatically slows energy transfer rates in response. Another technical effect of the charging system 100 described herein is the ability to provide a required amount of performance during a charging operation utilizing smaller and/or cheaper components. For example, due to the cooling of the power terminals 304, the charging system 100 may utilize smaller, cheaper power cables 108 than known charging systems to achieve the same or better results.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. Dimensions, types of materials, orientations of the various components, and the number and positions of the various components described herein are intended to define parameters of certain embodiments, and are by no means limiting and are merely example embodiments. Many other embodiments and modifications within the spirit and scope of the claims will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A charging system comprising:
    an electrical power terminal including a pin and a block, the block having a front side and a rear side, the pin extending from the front side of the block to a distal end of the pin, the block including a termination pad surface, the block defining a port therethrough that is spaced apart from the termination pad surface;
    a power cable mechanically coupled and electrically connected to the termination pad surface of the block; and
    a cooling tube extending into the port of the block and configured to absorb and dissipate heat from the block.

2. The charging system of claim 1, wherein the termination pad surface is on the rear side of the block.

3. The charging system of claim 1, wherein the termination pad surface is planar and the port extends linearly along a port axis that is parallel to a plane of the termination pad surface.

4. The charging system of claim 1, wherein the port extends linearly through the block from a first outer side to a second outer side that is opposite the first outer side.

5. The charging system of claim 1, wherein the pin is integrally formed with the block such that the electrical power terminal has a one-piece, monolithic structure lacking an interface joint between the pin and the block.

6. The charging system of claim 1, wherein the pin is discrete from the block, the block defining an aperture along the front side, the pin having a proximal end opposite the distal end, the proximal end received into the aperture to couple the pin to the block.

7. The charging system of claim 1, wherein the termination pad surface of the power terminal comprises copper and the power cable comprises one or more copper conductors that are ultrasonically welded to the termination pad surface.

8. The charging system of claim 1, wherein the cooling tube extends continuously through the port and protrudes from both a first opening of the port and a second opening of the port.

9. The charging system of claim 1, wherein the pin is elongated along a pin axis and the port is linearly elongated along a port axis from a first opening to a second opening, wherein the port axis is perpendicular to the pin axis.

10. An electrical power terminal comprising:
    a pin having a distal end and a proximal end opposite the distal end; and
    a block having a front side and a rear side opposite the front side, the front side of the block attached to the proximal end of the pin, the block defining a port therethrough that is configured to receive a cooling tube, wherein the block is composed of one or more metals, the block including a termination pad surface that is planar and is configured to mechanically couple and electrically connect to a power cable.

11. The electrical power terminal of claim 10, wherein the port extends linearly through the block from a first outer side to a second outer side that is opposite the first outer side, wherein the port is spaced apart from each of the front side and the rear side.

12. The electrical power terminal of claim 10, wherein the pin is integrally formed with the block such that the electrical power terminal has a one-piece, monolithic structure lacking an interface joint between the pin and the block.

13. The electrical power terminal of claim 10, wherein the pin is elongated along a pin axis and the port is elongated along a port axis that is perpendicular to the pin axis.

14. The electrical power terminal of claim 10, wherein the termination pad surface is on the rear side of the block.

15. The electrical power terminal of claim 14, wherein the port is located between the termination pad surface of the block and the pin and is spaced apart from the termination pad surface, wherein the port is elongated parallel to a plane of the termination pad surface.

16. The electrical power terminal of claim 10, wherein the pin is discrete from the block, the block defining an aperture along the front side, the proximal end of the pin received into the aperture to couple the pin to the block.

17. The electrical power terminal of claim 16, wherein the pin includes a first metallic composition, and the block includes a second metallic composition that is different from the first metallic composition of the pin.

18. A charging system comprising:
   a charging inlet including a housing and multiple electrical power terminals held by the housing, the charging inlet configured to releasably couple to a mating connector of an external power source, wherein each of the power terminals includes a pin and a block, the block having a front side and a rear side, the pin extending from the front side of the block to a distal end of the pin, the block including a termination pad surface, the block defining a port therethrough that is spaced apart from the termination pad surface;
   multiple power cables extending from the charging inlet to a battery pack, each of the power cables mechanically coupled to and electrically connected to the termination pad surface of a different one of the power terminals; and
   multiple cooling tubes extending from the charging inlet to a heat sink for dissipating heat from the charging inlet, each of the cooling tubes extending into the port of the block of a different one of the power terminals.

19. The charging system of claim 18, wherein each of the cooling tubes has a metallic segment and a polymeric segment adjacent to the metallic segment along a length of the cooling tube, the metallic segment extending into the port of the block, the polymeric segment spaced apart from the charging inlet.

20. The charging system of claim 18, wherein the cooling tubes convey a working fluid through the ports of the power terminals to the heat sink to dissipate heat absorbed from the power terminals.

\* \* \* \* \*